Nov. 23, 1965   A. E. BROWN   3,218,854
FLOWMETERS
Filed Sept. 14, 1962   3 Sheets-Sheet 3
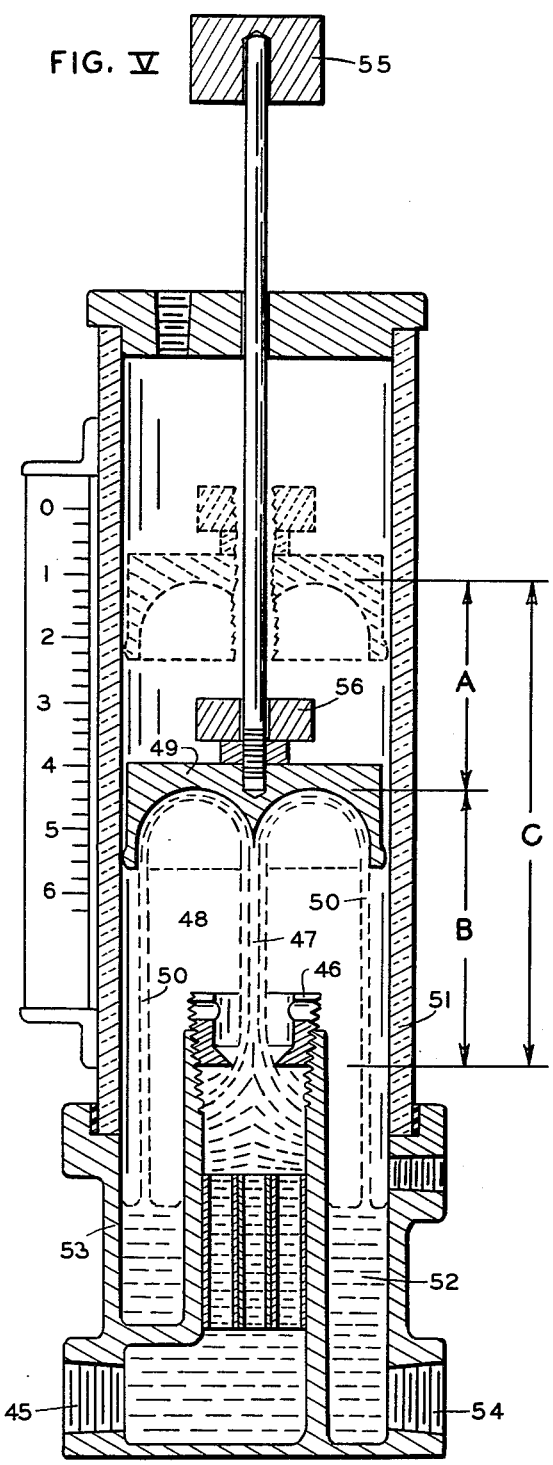
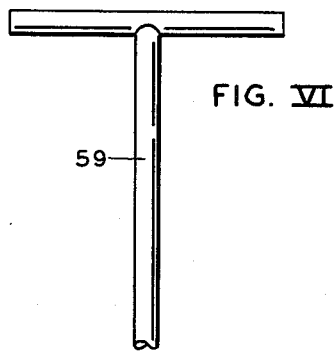
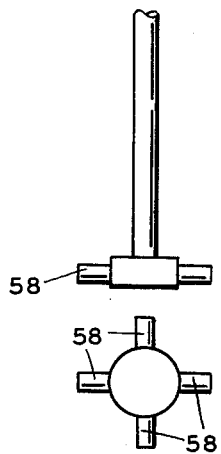
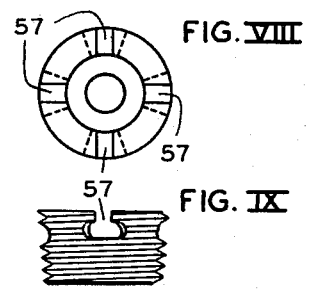
Arthur E. Brown United States Patent Office 3,218,854
Patented Nov. 23, 1965

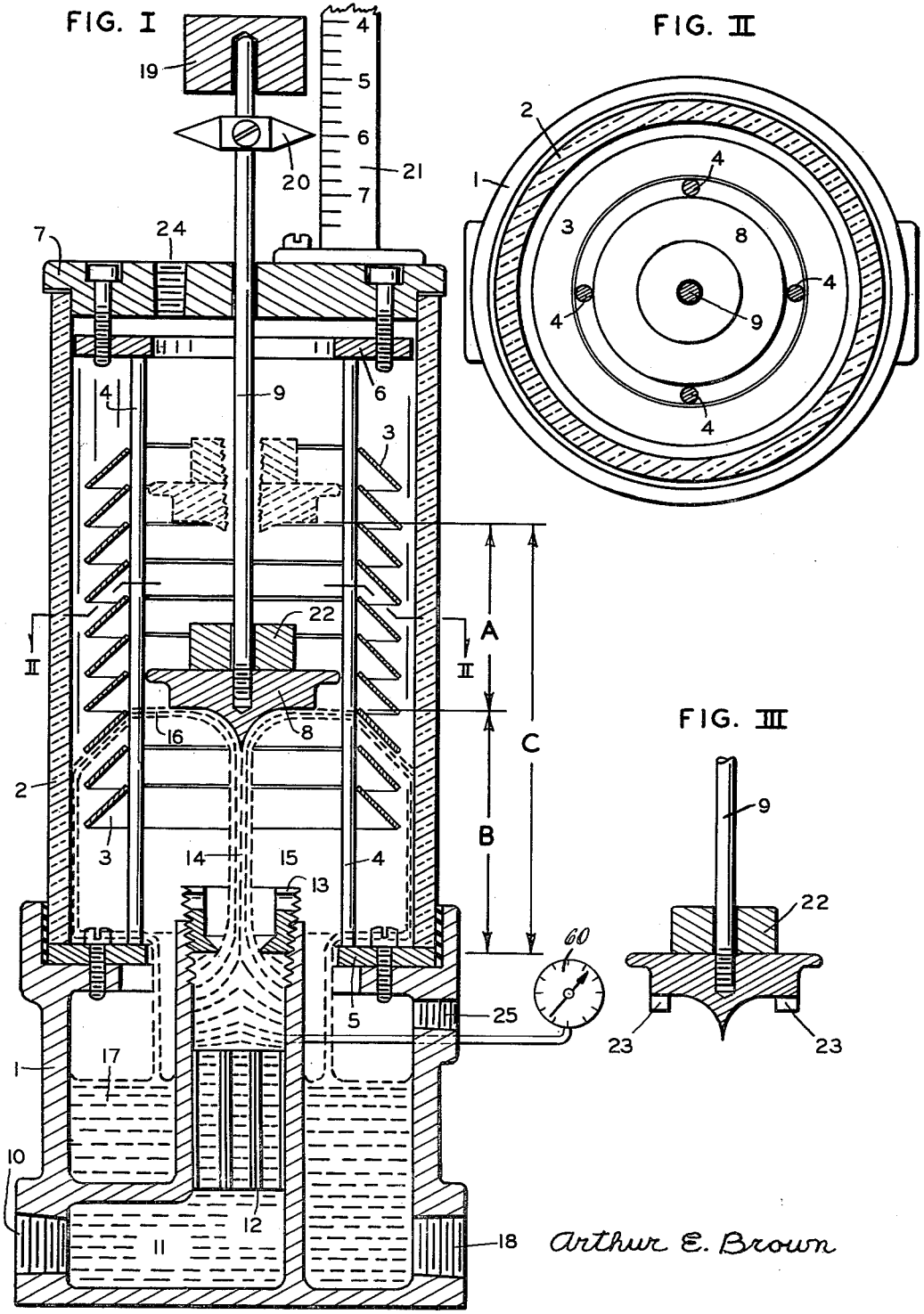

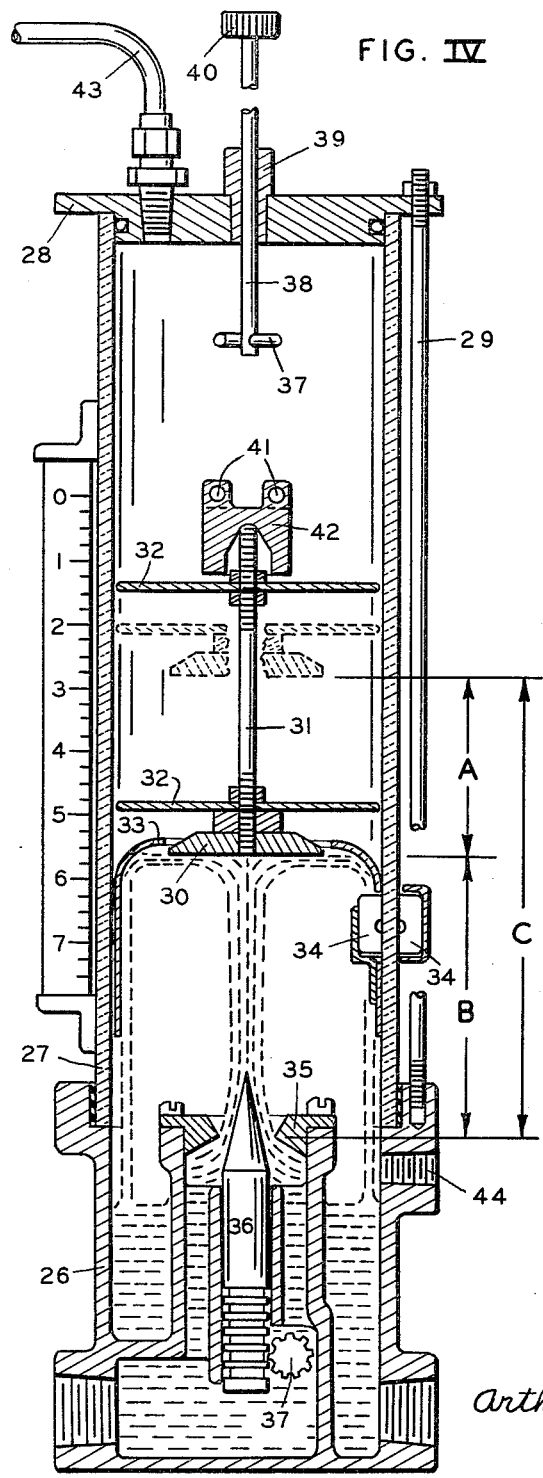
FIG. IV
Arthur E. Brown

3,218,854
FLOWMETERS
Arthur E. Brown, 52 Valley Road, Nahant, Mass.
Filed Sept. 14, 1962, Ser. No. 223,620
12 Claims. (Cl. 73—228)

This invention relates to flowmeters for measuring the flow rate of fluids, and particularly for measuring the mass flow rate of liquids.

Several mass flow meters have been developed prior to this invention. In one type the fluid is given a known angular velocity using an axial flow impeller driven by a precision speed electric motor. The rotating fluid then passes through an impulse wheel which acts against a precision spring, the degrees of rotation being an indication of mass flow rate.

In a second prior type, the working fluid flows through a radial duct in a rotor wheel driven by a precision speed electric motor. The torque required to give the fluid a known Coreolis acceleration is an indication of the mass flow rate. The torque is measured with electric strain gauges and the electrical signal therefrom transmitted by way of slip rings to stationary brushes.

The two prior art mass flowmeters described above are complex and expensive since they require electric motors which must be held precisely at a given speed. Also, the use of springs, strain gauges, slip rings, and electronic equipment for the strain gauges introduces further complication and sources of error.

One of the most widely used volumetric flowmeters for laboratory use has been the so-called rotameter design which consists of a vertical tapered tube and a float member free to move vertically. This type must be calibrated (generally done with a weigh tank and timing device) and must be corrected for both fluid density variations and the effects of viscosity. In measuring the flow rate of hydraulic oil using a rotameter, it is necessary to operate at a specified oil temperature or employ correction curves for operation at other temperatures because of change in viscosity with oil temperature.

A primary object of this invention is to provide a flowmeter capable of measuring the flow of liquid substantially independent of the viscosity or density of the liquid.

Another object is to measure the mass flow rate of liquid in terms of pounds per second.

Another object of the invention is to provide a mass flowmeter which is simple in construction and lower in cost. This objective is facilitated by the fact that no electric drive motor or other rotating parts are required. Also, no electric power source of accurate frequency is required.

An advantage of the invention is that the flow rate can be calculated directly according to basic physical laws without the necessity of calibrating with a weigh tank and timing device.

An advantage of the flow meter invention is that it is reliable. There are no springs or timing devices to get out of calibration. Nor are there any electronic components nor electrical strain gauges nor any electric slip rings. Instead, the flow rate is determined by two dead weights and a vertical distance as measured by a scale. It is very unlikely that the dead weights or the scale would get out of calibration.

An advantage of the flow meter is that the vertical scale readings may be spread over a long scale. In one calculated design the flow rate varying between .59 lbs./sec. and 1.18 lbs./sec. (5 g.p.m. to 10 g.p.m. for hydraulic oil) was spread over a vertical scale 8.25 inches long. This facilitates accuracy of reading since many scale divisions may be indicated. To change capacity of the flow meter it is merely necessary to change the weights and the orifice area; then larger or smaller capacity flow rates can be read using the same vertical scale.

The attached drawings illustrate specific embodiments of the invention, in which:

FIGURE I is a section view of one embodiment.
FIGURE II is a section view taken along the line II—II in FIGURE I.
FIGURE III is a section view of an alternate form of impulse disk for use in the flowmeter shown in FIGURES I and II.
FIGURE IV is a section view of second embodiment.
FIGURE V is a section view of a third embodiment.
FIGURE VI is a side view of a tool for changing the orifice plug in the flowmeters shown in FIGURES I and V.
FIGURE VII is an end view of the tool shown in FIGURE VI.
FIGURE VIII is a top view of the orifice plug used in the flowmeters shown in FIGURES I and V.
FIGURE IX is a side view of the orifice plug shown in FIGURE VIII.

Referring to FIGURES I and II, the flowmeter is constructed of a cast metal base 1 supporting a tubular glass cylinder 2. A series of nested sheet metal cones 3 are mounted on four vertical rods 4, the ends of which are fastened to the metal rings 5 and 6. A cap member 7 is held on to the top of the glass cylinder by means of screws. A circular impulse disk 8 is mounted on the lower end of the vertical center rod 9. The impulse disk is guided at its outer flange by the four vertical rods 4 and the center rod 9 passes through a central hole in the cap 7 so that the rod 9 and disk 8 are free to move vertically and also rotate within the structure.

Operation of the flowmeter shown in FIGURES I and II is as follows: The liquid being measured is conducted in through tapped inlet opening 10 and passes along the duct 11. Parallel tubes 12 are pressed into the vertical portion of the duct 11 and the purpose of the tubes 12 is to straighten out the flow in the duct so that it is parallel and nonturbulent as it approaches the orifice plug 13. The liquid issues from the sharp edged orifice plug in the form of a free vertical jet 14 surrounded by the air space 15. The jet rises through a vertical distance B before it strikes the circular impulse disk 8 which then turns the jet 90 degrees in its direction of motion. The jet leaves the disk in the form of a horizontal sheet 16 spreading out in all directions. The liquid then strikes one or more of the sheet metal cones 3 and is deflected downward along the sides of the tubular glass cylinder 2. The liquid then flows down into a pool 17 in the base and leaves at outlet 18.

The purpose of the cones 3 is to deflect the sheet of liquid 16 downward. Without the cones, and during high flow rates, the liquid tends to pile up in the form of a ring on the side of the glass cylinder and then begins to interfere with the flow of liquid as it leaves the impulse disk 8. If a larger diameter glass cylinder is used, then the liquid has more time to fall away and the metal cones 3 may be dispensed with but this results in a less compact arrangement.

In FIGURE I, the impulse disk 8 is drawn in two different vertical locations, with solid lines at one height B, and with dotted lines at a second height C. The velocity of the jet is at its maximum as it emerges from the orifice plug 13. After the liquid leaves the orifice, the force of gravity slows down the velocity of the liquid as it rises in the vertical jet 14. This means that the velocity of the liquid is greater when it strikes the impulse disk at height B than at height C, which results in greater hydraulic impulse force on the disk at height B than at height C. To determine the flow rate, the weight 19 should be lifted from the rod 9. The impulse disk 8 and rod 9 will then rise vertically until the hydraulic impulse force of the jet just balances the weight of the parts. Using the indicator 20, the vertical location of the parts is then observed from the scale 21 and recorded. Then the weight 19 is placed back on top of the rod 9. The added weight will cause the disk and rod 10 to descend until the hydraulic impulse force balances the increased weight and the vertical location of the parts is again observed by reference to the scale 21.

The formula for computing flow rate and the derivation of the formula will next be explained.

Let:

$W$ = flow rate of liquid in pounds per second.

$F_b$ = total weight (pounds) of parts held up by the jet when at height B = weight of disk 8, rod 9, weight 22, indicator 20, and weight 19.

$F_c$ = total weight (pounds) of parts held up by the jet when at height C = weight of disk 8, rod 9, weight 22, and indicator 20.

$V_b$ = vertical velocity (inches per second) of liquid as it strikes impulse disk 8 when at height B.

$V_c$ = vertical velocity (inches per second) of liquid as it strikes impulse disk 8 when at height C.

$V_o$ = vertical velocity (inches per second) of liquid as it leaves the orifice plug 13.

$G$ = acceleration of gravity = 32.2 feet per second squared = 385 inches per second squared.

From hydraulic text books, the force of a hydraulic jet hitting a flat plate = $WV/G$. Applying the formula to the flow meter:

$$F_b = \frac{WV_b}{G} \text{ and } F_c = \frac{WV_c}{G}.$$

From physics text books, the equation of uniformly decelerated motion is:

2 × deceleration × distance = original velocity squared minus final velocity squared.

Applying this formula to the flow meter:

$2GB = V_o^2 - V_b^2$ and $2GC = V_o^2 - V_c^2$. From FIG. I, $A = C - B$.

If the above 5 equations are solved simultaneously, then the formula for flow rate becomes $$W = \sqrt{\frac{G(F_b^2 - F_c^2)}{2A}} = \text{pounds per second}$$

This is a very simple and workable formula since the acceleration of gravity is accurately known and the terms $F_b$ and $F_c$ are the weights of the movable parts which may be very accurately predetermined using a precision balance. It is thus seen that for a given flow reading, the only variable (or quantity to be measured) is the vertical distance A which is the distance the parts descend upon the addition of the weight 19. If desired, the vertical scale 21 may be graduated directly in pounds per second flow rate instead of inches in which case it must be movable relative to the orifice plug and must be "zeroed" for each flow reading.

It is noted from the flow formula that it is not necessary to know the velocity of the jet at any position nor is it necessary to know the heights B and C. It is not necessary to know the orifice diameter nor the pressure drop across the orifice nor the fluid density or viscosity. Just the vertical drop A and the weights $F_b$ and $F_c$ are all that are needed.

The capacity range of the meter may be extended by employing several sets of weights. If for example it is desired to double the capacity, then the weights $F_b$ and $F_c$ may be doubled to get double the flow rate for the same vertical deflection A. The orifice plug 13 may be easily removed (using the tool shown in FIGURES VI and VII) and replaced with either a larger or smaller orifice plug depending on the flow range required.

The impulse disk 8 and rod 9 encounter frictional resistance to vertical motion as they slide against the rods 4 and cap 7. To eliminate this frictional effect (and thereby improve accuracy), the rod 9 may be given an initial rotation by hand or if desired, the disk 8 may be provided with small vanes 23 (as shown in FIGURE III) set at an angle so that flow of the fluid past the vanes will impart rotation to the disk.

Pipe tap connections 24 and 25 are provided for the purpose of supplying air (or gas) under pressure to the interior of the flow meter in case atmospheric pressure is not sufficient to bring the discharge pressure at 18 up to the desired value.

Referring to FIGURE IV, a cast metal base 20 supports a tubular glass cylinder 27 and a cap member 28 is held on the top by means of several threaded tie rods 29. An assembly consisting of a circular impulse disk 30, rod 31, and two thin circular guide disks 32, is free to move vertically and rotate within the glass cylinder. The disks 32 closely approach the inside walls of the cylinder 27 and are guided thereby. A single deflector ring 33, for deflecting the flow downward along the sides of the glass cylinder, is employed instead of the multiple cones 3 used in the FIG. I construction. The vertical location of the ring 33 is adjusted manually so as to be always set slightly above the impulse disk 30. A coupling consisting of several pairs of permanent magnets 34 permits manual positioning of the ring 33 from outside the glass cylinder. An alternate method (not shown) of positioning the ring 33 is to employ a vertical rod attached to the ring and which passes up through the disks 32 and cap 28. The flow area through the orifice 35 may be conveniently varied by changing the vertical position of the flow needle 36. Circular rings and grooves having rack tooth profiles are machined on the bottom end of the needle member 36. A pinion gear 37 meshes with the rings and grooves and its shaft extends to the outside of the housing or base 26 where a knob is attached for adjustment of the needle. A small S-shape rod 37 is attached to the vertical rod 38 which passes through the guide 39. By rotating and depressing the knob 40, the S-shaped rod may be made to engage the holes 41 in two lugs on the top of the weight 42. In this manner the weight 42 may be removed from the rod 31 and redeposited at will without opening up the inside of the glass cylinder to atmospheric pressure. The tube connections 43 and 44 are for supplying air or gas under pressure to the interior of the flowmeter. Operation of the flowmeter shown in FIG. IV is similar to the FIG. I device and the same equations apply.

Operation of the flowmeter shown in FIG. V is as follows: The liquid being measured enters the inlet 45, flows through and around the flow straightener tubes and issues from the orifice plug 46 in the form of a free vertical jet 47 surrounded by air or gas in the space 48. The impulse disk 49 has its deflecting surface shaped like one half of the inside of a geometric torus whose inner diameter is zero. The jet strikes the impulse disk 49 and the direction of motion of the jet is turned 180 degrees by the disk so that the liquid then drops downward (at 50 near the sides of the glass cylinder 51) into the pool 52 in the base 53 of the meter. The liquid leaves the meter at outlet 54. The flow rate is determined as in the description of FIG. I by measuring the vertical drop A of the parts upon the manual addition of the weight 55. To change range capacity, the weights 55 and 56 may be exchanged for either heavier or lighter ones.

The formula for flow rate in the case of the FIG. V flowmeter is $$W\sqrt{\frac{G(F_b^2 - F_c^2)}{8A}}$$

This differs from the formula for the FIGS. I and IV flowmeters because the impulse disk turns the liquid 180 degrees instead of 90 degrees. The flowmeter shown in FIG. V has a simpler construction than FIG. I or IV but is not as accurate for some applications. The FIG. V flowmeter is subject to the effects of viscosity since a highly viscous liquid will tend to slow down or lose velocity as it travels around the 180 degree curves of the impulse disk 49 and this means that the lifting force due to impulse of the jet on the disk 49 is dependent on viscosity of the liquid. For this reason, the FIG. V flowmeter is not as accurate as the other two and should be used with liquids having a lower viscosity.

It is noted that viscosity does not effect the reading in the flowmeters shown in FIGS. I and IV since the vertical velocity of the jet is reduced to zero using a 90 degree change of flow direction and the velocity of the horizontal sheet leaving the impulse disk has no effect on the flow reading.

Referring to FIGS. VI through IX, each orifice plug is provided with four T slots 57. The four radial pins 58 on the end of the wrench 59 engage the T slots so as to both hold the plug to the wrench and also drive the taper threaded plug. The T handled wrench 59 can reach down through the top of the flow meters and conveniently change orifice plugs without disturbing the glass cylinders or the inlet and outlet pipe connections to the flowmeters.

Referring again to FIG. I, an alternate method of determining the flow rate is to measure the pressure drop across the orifice 13 (using a pressure gauge 60 or U tube) and also measure the height B in FIG. I. Using this method, and assuming a frictionless orifice, the flow rate becomes:

$$W = F_b \sqrt{\frac{G}{2\left(\frac{\Delta P}{d} - B\right)}} \text{ pounds per second}$$

where $W$ = flow rate of liquid in pounds per second
$F_b$ = total weight (pounds) of parts supported by the jet at height B.
$G$ = acceleration of gravity.
$\Delta p$ = pressure drop across orifice (pounds per square inch)
$d$ = density of fluid (pounds per cubic inch).
$B$ = height of impulse disc above orifice (inches).

In connection with the above last described method of measuring flow rate, a reentrant type mouthpiece (sometimes called Borda mouthpiece) may be used in place of the orifice plug 13 to reduce the effect of viscous friction. A Borda mouthpiece is described on page 65 in the hydraulic text book "Mechanics of Liquids," by Ralph W. Powell.

Referring again to FIG. I, still another alternate method of determining the flow rate is to use the formula:

$$W = dC_d A_0 \sqrt{2GB + \frac{G^2 F_b^2}{W^2}}$$

where $C_d$ = coefficient of discharge of the orifice = .5 for a Borda mouthpiece.
$A_0$ = area (square inches) of the orifice, and the other terms are the same as previously defined.

While preferred embodiments of the invention have been described, it will be understood that the invention is not limited thereto since it may be otherwise embodied within the scope of the following claims.

What is claimed is:

1. In a flowmeter for measuring the rate of flow of a liquid, the combination of a duct for conducting the flow of said liquid, said duct serving to direct the flow of said liquid into a vertically upward free jet, said free jet being surrounded directly by a gas atmosphere, said jet being acted upon by the force of gravity so as to reduce the velocity of the upward moving liquid in the jet, an impulse member, said jet being directed against said impulse member, said impulse member being adapted to deflect said jet, a second member for attachment to said impulse member, the weight of said impulse member being supported at one vertical location by the impulse of said jet, the weight of both said impulse member and said second member being supported at a lower vertical location by the impulse of said jet, means for measuring the distance between the two said vertical locations, and said distance and the weights supported by said jet being used to measure the rate of flow of the liquid.

2. The combination recited in claim 1 wherein said impulse member deflects said jet into a horizontally directed sheet of liquid spreading radially outward, and wherein a plurality of deflector rings surrounds the path of travel of said impulse member, and said deflector rings being adapted to deflect said horizontal sheet of liquid vertically downward.

3. In a flowmeter for measuring the rate of flow of a fluid, the combination of an enclosure structure, a duct for conducting the flow of said fluid, a restriction at the outlet end of said duct, said duct with said restriction serving to direct the flow of said fluid into a vertically upward jet, said jet being surrounded by a gas atmosphere, said gas atmosphere being contained within said enclosure structure, said jet being acted upon by the force of gravity so as to reduce the velocity of the upward moving fluid in the jet, an impulse member, said jet being directed against said impulse member, said impulse member being adapted to deflect said jet in its direction of motion, a vertical rod attached to said impulse member, said vertical rod passing through an opening in the top of said enclosure structure, said impulse member and said vertical rod being guided for vertical motion within said enclosure structure, a second member for temporary attachment to said vertical rod at a location outside said enclosure structure, the weights of said impulse member and said vertical rod being supported at one vertical location by the impulse of said jet, the weights of said impulse member and said vertical rod and said second member being supported at a lower vertical location by the impulse of said jet, means for measuring the distance between the two said vertical locations, and said distance and the weights supported by said jet being used to measure the rate of flow of the fluid.

4. The combination recited in claim 1 wherein said impulse member is free to rotate about a vertical axis, and wherein said impulse member is provided with vanes adapted to react against the flow of said liquid and thereby impart rotation to the impulse member, and the purpose of rotating the impulse member being to reduce the effect of friction against vertical motion of the impulse member.

5. The combination recited in claim 1 wherein an orifice is located at the outlet end of said duct for restricting the flow of liquid in said jet.

6. In a flowmeter for measuring the rate of flow of a liquid, the combination of an enclosure structure, a duct for conducting the flow of said liquid, said duct serving to direct the flow of said liquid into a jet, said jet being surrounded by a gas, said gas being contained within said enclosure structure, said enclosure structure being pressurized with said gas at pressures exceeding atmospheric for the purpose of raising the discharge pressure of said liquid leaving the enclosure structure, said jet being acted upon by the force of gravity so as to change the velocity of the moving liquid in the jet, an impulse member, said jet being directed against said impulse member, said impulse member being adapted to deflect said jet, and means for measuring the impulse force of said jet against said impulse member.

7. In a flowmeter for measuring the rate of flow of a liquid, the combination of an enclosure structure, a duct for conducting the flow of said liquid, said duct serving to direct the flow of said liquid into a vertical jet, said jet being surrounded by a gas atmosphere, said gas atmosphere being contained within said enclosure structure, said vertical jet being acted upon by the force of gravity so as to reduce the velocity of the upward moving liquid in the jet, an impulse member mounted for vertical travel within said enclosure structure, said jet being directed against said impulse member and deflected thereby, a second member located above said impulse member and contained within said enclosure structure, said second member being intermittently supported by said impulse member, lifting means for lifting said second member from said impulse member, said lifting means being operable from a location outside said enclosure structure, said impulse member being supported at one vertical location by the impulse of said jet, said impulse member plus the weight of said second member being supported at a lower vertical location by the impulse of said jet, and means for measuring the distance between the two said vertical locations.

8. The combination recited in claim 1 wherein said impulse member deflects said jet into a horizontally directed sheet of liquid spreading radially outward, and wherein at least one deflector ring surrounds the path of travel of said impulse member, and means for adjusting the vertical location of said deflector ring to correspond with the varying vertical location of said impulse member, and said deflector ring serving to deflect said horizontal sheet of liquid vertically downward.

9. The combination recited in claim 1 wherein a variable area nozzle is located at the discharge end of said duct for controlling the flow of liquid in said jet, said nozzle having a tapered needle mounted for axial adjustment within the nozzle so as to vary the flow area, and means for moving said needle and holding it in set position.

10. In a flowmeter for measuring the rate of flow of a liquid, the combination of a duct for conducting the flow of said liquid, said duct serving to direct the flow of said liquid into a free vertical jet stream, said free jet stream being surrounded directly by a gas atmosphere, said free jet stream having a free flight through said gas atmosphere, said free jet stream being acted upon by the force of gravity so as to change the velocity of the moving liquid along the length of the jet stream during said free flight, an impulse member, said free jet stream being directed against said impulse member, said impulse member being shaped so as to deflect substantially all of said jet stream from a vertical direction of motion to a horizontal direction of motion, said liquid leaving said impulse member in the form of a horizontal sheet of liquid moving radially outward, means for measuring the impulse force of said jet stream against said impulse member in at least one location along said free jet stream, and means for determining a vertical travel of said free jet stream.

11. In a flowmeter for measuring the rate of flow of a liquid, the combination of a duct for conducting the flow of said liquid, said duct serving to direct the flow of said liquid into a vertically upward free jet stream, said free jet stream being surrounded directly by a gas atmosphere, said free jet stream having a free flight through said gas atmosphere, said free jet stream being acted upon by the force of gravity so as to reduce the velocity of the upward moving liquid along the jet stream, an impulse member larger in diameter than said jet stream, said impulse member serving to deflect substantially all of said jet stream in its direction of motion, the weight of said impulse member being supported by the impulse force of said jet stream, said impulse member being of sufficient weight so as to deflect said jet stream at a vertical location substantially below the maximum undisturbed free height of said jet stream, the weight of said impulse member being a parameter for determining said rate of flow, means for determining a vertical height of said impulse member in at least one vertical location, and said vertical height of said impulse member being a second parameter for determining said rate of flow.

12. The combination recited in claim 11 wherein an orifice is located at the outlet end of said duct, and wherein the flow area of said orifice and its coefficient of discharge are also parameters for determining said rate of flow.

References Cited by the Examiner

UNITED STATES PATENTS

| 1,401,299 | 12/1921 | Wohlenberg | 73—228 |
| 2,370,210 | 2/1945 | Turner | 73—194 X |
| 2,605,638 | 8/1952 | Pearson | 73—228 |
| 2,707,394 | 5/1955 | Lewis | 73—228 |

FOREIGN PATENTS

| 215,355 | 10/1909 | Germany. |
| 262,313 | 9/1949 | Switzerland. |

RICHARD C. QUEISSER, *Primary Examiner.*